(12) United States Patent
Matsuyama

(10) Patent No.: US 7,325,113 B2
(45) Date of Patent: Jan. 29, 2008

(54) MEMORY PROTECTION APPARATUS

(75) Inventor: Hideki Matsuyama, Kanagawa (JP)

(73) Assignee: NEC Electronics Corporation, Kawasaki, Kanagawa (JP)

(*) Notice: Subject to any disclaimer, the term of this patent is extended or adjusted under 35 U.S.C. 154(b) by 352 days.

(21) Appl. No.: 11/086,762

(22) Filed: Mar. 23, 2005

(65) Prior Publication Data

US 2005/0216686 A1 Sep. 29, 2005

(30) Foreign Application Priority Data

Mar. 25, 2004 (JP) ............... 2004-088489

(51) Int. Cl.
*G06F 12/00* (2006.01)
(52) U.S. Cl. .................... 711/163; 711/152
(58) Field of Classification Search ............... None
See application file for complete search history.

(56) References Cited

U.S. PATENT DOCUMENTS

2002/0188852 A1* 12/2002 Masaki et al. ............... 713/182

FOREIGN PATENT DOCUMENTS

JP 2000-163309 6/2000

* cited by examiner

*Primary Examiner*—Reginald Bragdon
*Assistant Examiner*—Ngoc Dinh
(74) *Attorney, Agent, or Firm*—McGinn IP Law Group, PLLC

(57) ABSTRACT

Memory protection apparatus to protect memory area to realize high interruption response and prohibit from access to the memory area that is previously designated. The memory area data registers 132 (1) to (m), respectively, retain data which designate the accessible memory area in the processing corresponding to interruption of the group number corresponding to it. Selection circuit 133 selects any of the memory area data registers 132 (1) to (m) according to the group number retained by the group number register 131, and outputs data that designates selected memory area retained by the memory area data registers 132. Address bus watching part 106 watches generation of illegal memory access of the processor according to the data designating the memory area output by the selection circuit 133.

10 Claims, 3 Drawing Sheets

MEMORY PROTECTION APPARATUS

FIELD OF THE INVENTION

The present invention relates a memory protection apparatus, particularly, to an apparatus in which a program is prohibited from access to an area other than those designated therein and protects data and programs being stored in that memory.

BACKGROUND OF THE INVENTION

Embedded systems for particular purposes of usage are coming into wide use. The embedded systems have been applied by various field such as home electric apparatus, automobiles, etc. In an embedded system, the processor usually receives an interrupting signal from a control object and controls the apparatus by executing a processing in response to an interrupting signal generated.

FIG. 3 shows how the mode of processing executed by the processor updates in response to interruptions generated. When the processor receives interruption 1 at time t1 of a processing during an execution, it interrupts the running processing, and executes processing corresponding to the interruption 1. When return instruction signal (RET) is generated at time t2, the processor reopens the execution of the processing that has been interrupted upon receipt of the interruption 1. After that, the processor executes a processing corresponding to interruption 8 at time t3 to interrupt again the running processing when the processor receives new interruption 8 at time t3.

During execution in response to interruption 8, the processor receives interruption 1 at time t4 again, then executes the processing in response to interruption 1 to interrupt the running processing. Besides, during the execution responding to interruption 1, upon receiving interruption 2 at time t5, the processor executes a processing in response to the interruption 2. When the processing in response to the interruption 2 generates a return instruction RET at time T6, the processor reopens the processing being interrupted in response to interruption 1. The processor reopens the processing in response to interruption 8 when the reopened processing corresponding to interruption 1 generates a return instruction RET at time t7. When the processing corresponding to the interruption 8 generates a return instruction RET at time t8, the processor reopens the processing interrupted in order to execute the processing which responds to the interruption 8 at time t3.

In an embedded system, the processing corresponding to the interruptions is usually executed by the same memory sources. Therefore, in case where the processing by the processor proceed in a fashion as shown in FIG. 3, if the processing corresponding to the interruption 2 rewrites contents in a memory area used as data area and program area by the processing corresponding to the interruption 1 which was running just before, the data to be used for processing corresponding to the interruption 1 is destroyed. Then it occurs that the processing corresponding to interruption 1 to be reopened after time t7 is not executed correctly. In order to prevent such situation, it is preferred that the processing corresponding to each interruption is to be executed under memory protection to prohibit memory access outside the memory area previously designated for the processing in question.

The memory protection function is available in case where the OS designates the accessible memory area in the processing corresponding to each interruption. For example, in FIG. 3, upon receipt of an interruption 2 at time t5, the processor executes programs in the OS in which the processing corresponding to the interruption 2 is executed, after executing many programs including designation of accessible memory area in the processing corresponding to interruption 2 to be followed next. Besides, upon generating of the RET instruction at time t6 followed by reopening of the processing corresponding to the interruption 2, the programs of the OS are executed such that many programs including designation of the accessible memory area are executed followed by the processing corresponding to the interruption 1. The technique for the OS designating the accessible memory area etc. is disclosed in Patent Document 1, for example, In this point, the plurality of interruptions input to the processor include such interruptions that should finish the processing within a predetermined time after generation, in other words those which should correspond to a processing having a high real time performance as demanded. In case where the OS should set up the memory protection for the processing that requires high real time performance, the OS must execute many processing including designation of accessible memory area after generation of interruption until the OS opens execution of processing corresponding to the instruction. Therefore, there is the possibility that the real time performance of the processing would fail, to degrade the responsibility of interruption.

In each processing, the fact that the designation of an accessible memory area is available means, in the all, that it is possible to access an arbitrary area of memory area in the processing. Therefore, the setting of the accessible memory area should be executed with the OS. However, and in this case, it is difficult to execute the memory protection with high response characteristics of the interruption. Based on this reason, in the systems demanding high real time characteristics, weight is given on the characteristic of high response, and, each processing corresponding to interruptions is executed without memory protection, i.e., without setting the memory area accessible by the OS, as shown in FIG. 3.

[Patent Document 1]

Japanese Patent Kokai Publication No.P2001-163309A

SUMMARY OF THE INVENTION

By the way, in case where the programs corresponding to each processing are generated by the same section (by the same programmer), they can be prevented from destruction of data by considering the situation of using memory area and others, and by making up programs, so that data which are used in some processing are rewritten by the other processing. However, because that the objects controlled by one processor are increasing in the embedded system, every control object of the processing corresponding to each interruption is also generated by a different section. In this case, because it is impossible to know before the situation how the memory area is used, between the programs being generated by the different sections, it is impossible to prevent the data from destruction by accessing to memory area which can not be accessed inherently.

In order to avoid the above case, there is an increase in the demand that the memory protection should be secured by limiting the accessible memory area in each processing also in the systems requiring high real time characteristic. However, it was impossible to realize both high response characteristic of interruption and the memory protection because it was necessary for the OS to designate the accessible memory area in the prior art.

It is an object of the present invention to provide a memory protection apparatus that can realize high interrupting characteristic, prohibit access to the memory area other than those designated beforehand, thereby protecting the memory area.

According to the present invention there is a memory protection apparatus for protecting memory to limit memory access by a processor which executes processing corresponding to interruptions, comprising:

a memory data generating circuit for generating and outputting memory area data which designates an accessible memory area corresponding to a processing executed by the processor, and a memory access watching circuit for outputting a signal representing generation of illegal memory access to areas other than those which are designated by the memory area data generated by the memory data generating circuit.

In the memory protection apparatus of the present invention, the memory access watching section watches whether wrong access is generated or not, based on the memory area data generated by the memory data generating circuit. Therefore, because it is possible to limit the accessible memory area with high speed compared with setting memory protection by the OS, it is possible to execute processing by the processor to keep high interruption response in the status with the memory protection.

In the memory protection apparatus of the present invention, the group number is assigned to each interruption. Preferably, the memory data generating circuit comprises: a memory area data storage part to store the memory area data corresponding to the group number, a group number register to store the interrupting group number corresponding to the processing under the execution of the processor, and a memory area data selection part to read out the memory area data from the memory area data storage part based on the data stored by the group number register. In this case, it is possible for the memory area data selection part to readout the data that designates the accessible memory area under execution, through memorizing the group number corresponding to the processing under execution in the group number register.

The memory protection apparatus of the present invention preferably comprises further a group number generating circuit which generates the group number corresponding to the interruption generated, and upon receipt of an interruption by the processor, the group number register is updated by a group number, generated by the group number generating circuit. In this case, the group number register can be updated by a group number that corresponds to a newly executed processing.

It is preferred that the memory protection apparatus further comprises a history managing part to memorize the history of the interruption group numbers received by the processor, and the history managing part memorizes the group numbers stored in the group number register prior to updating the group number memorized in the group number register. In this case, it is possible to memorize the group numbers stored in the group number register by saving in the history managing part, before the group numbers stored in the group number register are updated by the group number (s) corresponding to the new processing.

In the memory protection apparatus of the present invention, the history managing part may comprise a stack area to memorize plurality of group numbers.

In the memory protection apparatus of the present invention, it is preferred that the group number register should be updated by the group number (or numbers) memorized in the history managing part when the processor generates a return instruction. In this case, the group numbers memorized in the group number register can be updated by the group number(s) corresponding to the reopened processing.

The memory protection apparatus according to the present invention can realize the memory area protection by prohibiting access to the area other than the area previously designated as well as the high interruption response characteristics even in such a system that requires high interruption responsibility, since it can designate the accessible memory area for the processing corresponding to the interruption without recourse to the OS.

REFERENCE SYMBOLS

Figure 1:
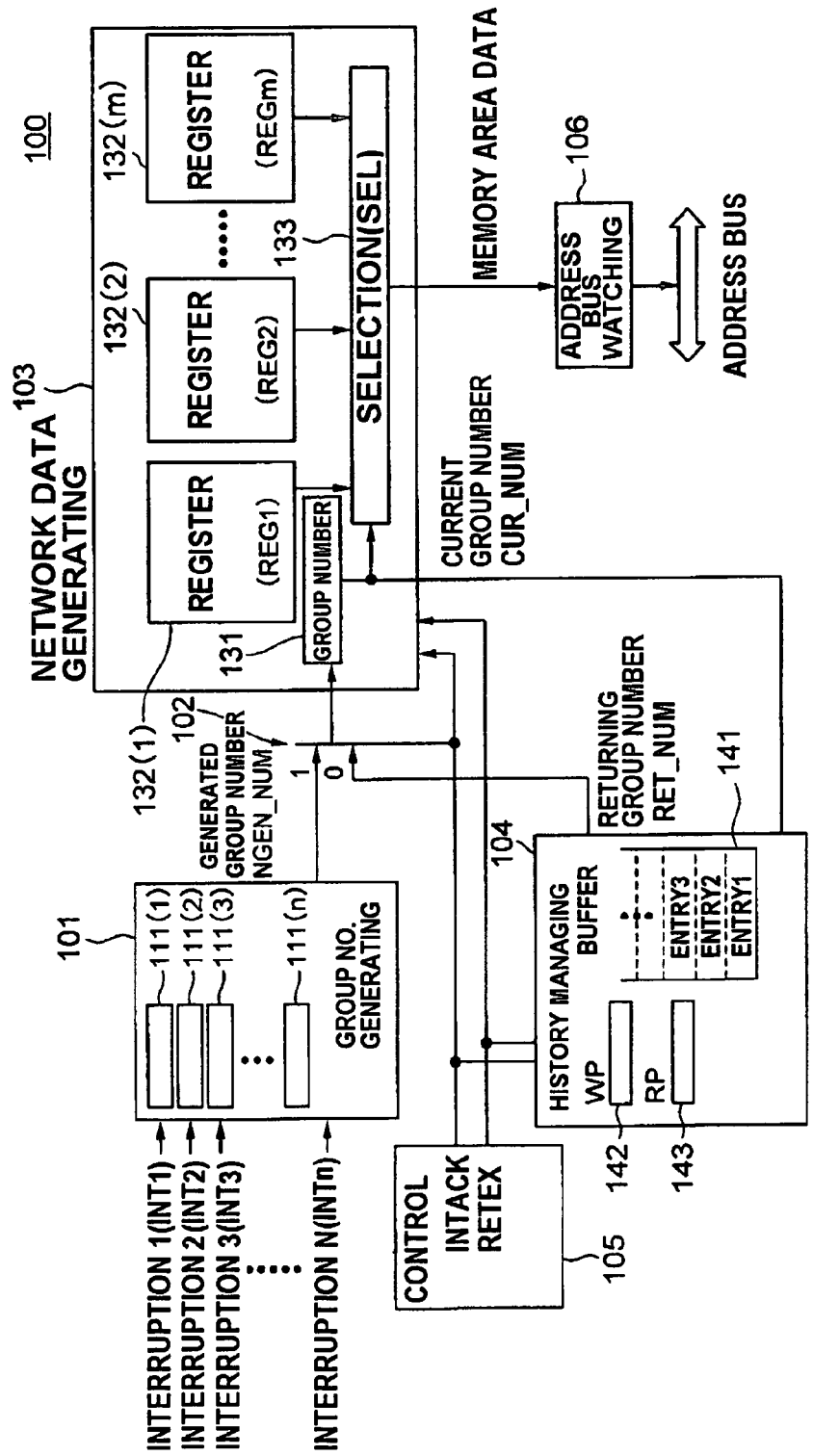
FIG. 1 is a block program, which shows a memory protection apparatus of one embodiment of the present invention.

100: memory protection apparatus
101: group number generating circuit
102: selector
103: memory data generating circuit
104: history managing buffer
105: control part
106: address bus watching part
111: group number designating register
131: group number register
132: memory area designating register
133: the selection circuit
141: history memorizing part
142: write pointer
143: read pointer

PREFERRED EMBODIMENTS

The embodiments of the present invention will be described below in detail with reference to the accompanying drawings. FIG. 1 shows an arrangement of a memory protection apparatus of a first embodiment of the present invention. This memory protection apparatus 100 is built in a semiconductor device like system LSI that makes up an embedded system together with a processor (not drawn). As shown in FIG. 1, the memory protection apparatus 100 comprises a group number generating circuit 101, a selector 102, a memory data generating circuit 103, a history management buffer 104, a control part 105 and an address bus watching part 106. The memory protection apparatus prevents illegal or impermissible memory access of the processor by watching.

The processor receives, as input, a plurality of interruptions (INT (1) to (n))(n: integer of 2 and over) and executes processing on a plurality of control objects corresponding to those interruptions. N number of interruptions are classified generally into OS level interruptions and user level interruptions, and they are classified into Group 0 to Group m. The OS level interruptions, that are the particular interruptions that operate in a special mode of priority, are designated as Group 0. The user level interruptions are divided into Group 1 to m(m: integer of $1 \leq m \leq n$). Assume that the number of the user interruptions is n and the interruption number n=group number m, the interruptions and the groups are in the one to one correspondence. In this case, it is assumed that processing programs corresponding to the interruptions which are set in the same group, are for example, produced by the same section, and no violation against the memory protection would occur among those interruptions in the same group.

The group number generating circuit 101 receives the plurality of interruptions INT(1) to INT(n) which are input to the processor, and outputs the group number designated by the interruption generated. The history managing buffer 104 retains the history of the group number(s) corresponding to the interruption(s) generated. The memory data generating circuit 103 outputs to the address bus watching part 106 the data related to the accessible memory area corresponding to the current interruption executed by the processor. The address bus watching part 106 watches the address bus according to input data related to the memory area.

The control part 105 generates an interruption receiving signal INTACK that is activated when the processor newly receives an interruption and a return execution signal RETEX that is activated when the processor generates a return instruction. The control part 105 turns the interruption receiving signal INTACK to an activated state ("1") when the processor newly receives an interruption, and the interruption receiving signal INTACK to a non-activated state ("0") during the other period. Besides, when the processor generates a return instruction during execution of the current processing, the control part 105 turns the return execute signal RETEX to the activated status ("1"), and the return instruction signal RETEX to the non-activated state ("0") during the other period.

The group number generating circuit 101 has group number designating registers 111 (1) to (n) that can approximately rewrite in response to the interruptions (1) to (n). Each of the group number designating registers 111 retains the group number in question of which the interruption corresponding to each of them belongs to. The group number generating circuit 101 outputs a group number retained by the group number designating register 111 corresponding to the interruption generated when certain interruption is generated, as a generated group number GEN_NUM, to the selector 102.

The history managing buffer 104 comprises a history memorizing part 141, a write pointer(WP) 142 and read pointer(RP) 143. The history managing buffer 104 receives, as the control signal, an interruption receiving signal INTACK and a return instruction execute signal RETEX. The history memorizing part 141 has a plurality of entries which memorize the group numbers. The write pointer (WP) 142 designates the address (entry) when the history memorizing part 141 memorizes a new group number. The read pointer (RP) 143 designates the address when the group number is read out of the history memorizing part 141, and retains an address preceding by one before an address that the write pointer (WP) 142 designates.

The write pointer (WP) 142 and the read pointer (RP) 143 are respectively incremented (+1) when the interruption receiving signal INTAC is activated, and they are decremented (−1) when the returning execute signal RETEX is activated. The history managing buffer 104 reads out the group numbers which are memorized in the addresses designated by the read pointer (RP) 143 and outputs them as the returning group number RET_NUM to the selector 102. When the write pointer (WP) 142 retains the [Entry 1] that shows the head address, the read pointer (RP) 143 retains the [Entry 0] that shows no address to be read out. In this case, that history managing buffer 104 outputs a value of NULL or a group number [0] to show no memory protection as a returning group number RET_NUM.

The selector 102 receives a generated group number NGEN_NUM output from the group number generating circuit 101, and the returning group number RET_NUM output from the history managing buffer 104, and outputs a group number selected according to the interruption receiving signal INTACK. The selector 102 outputs the generated group number NGEN_NUM when the interruption receiving signal INTACK is in the activated state, and the returning group number RET_NUM when the interruption receiving signal INTACK is in the deactivated state.

The memory data generating circuit 103 comprises a group number register 131, memory area designating registers 132 (1) to (m), and a selection circuit 133. To the memory data generating circuit 103 are input the interruption receiving signal INTACK and the return instruction signal RETEX, as the control signal. To the memory data generating circuit 103 are input the generated group number GEN_NUM, or the returning group number RET_NUM through the selector 102.

The group number register 131 retains the group number (s) designated for the interruption which is under execution by the processor. The group number register 131 outputs the group number currently retained to the selection circuit 133 and the history managing buffer 104, respectively, as a current group number CUR_NUM. The group number register 131 updates the memorized group number(s) by a generated group number NGEN_NUM when the interruption receiving signal INTACK is activated. That is, the memorized group number is updated by the group number designated by the interruption newly received. The group number register 131 updates the memorized group number (s) with the returning group number RET_NUM when the return instruction execute signal RETEX is activated.

The memory area designation register 132 (1) to (m) are respectively prepared in response to the Group 1 to m. Each of the memory area designating registers 132 retains the data relating to the accessible memory area corresponding to each the group. Each memory area designating register 132 retains the combination of the head address and the end address as data related to the accessible memory area(s). Each memory area designating register 132 retains a combination of the head address and the end address for each of the distributed areas, when the accessible memory area is distributed over plural areas. The data related to each memory area retained by each of the memory area designating registers 132 can be rewritten at desire according to the memory area used by each of interruptions.

When the group number retained by the group register 131 is not [0], the selection circuit 133 selects a memory area designating register 132 corresponding to the group number and outputs data related to the accessible memory area retained by the selected memory area designating register 132 to the address bus watching part 106. When the group number is [0], the selection circuit 133 shows that the accessible memory area(s) is/are not limited as the data related to the memory area, and outputs the NULL to show that the execution is performed without memory protection.

The address bus watching part 106 watches the address bus and decides the existence or not of generation of violation of memory protection according to the data related to the memory area being input. The address bus watching part 106 detects the existence or not of any access to addresses other than those shown by the data related to the memory area being input, when the data related to the accessible memory area is not NULL. When the address bus watching part 106 detects the access to any area outside the accessible memory area(s), it generates an interruption that violation memory protection has occurred, as the occurrence of an illegal memory access, and supplies the interruption of that effect to the processor. The processor executes a processing corresponding to the interruption when it receives the interruption reporting the occurrence of the illegal memory protection. When the input data related to the memory area is NULL, the address bus watching part 106 does not detect the existence or not of the illegal access because it permits access to all the memory areas.

Figure 2:
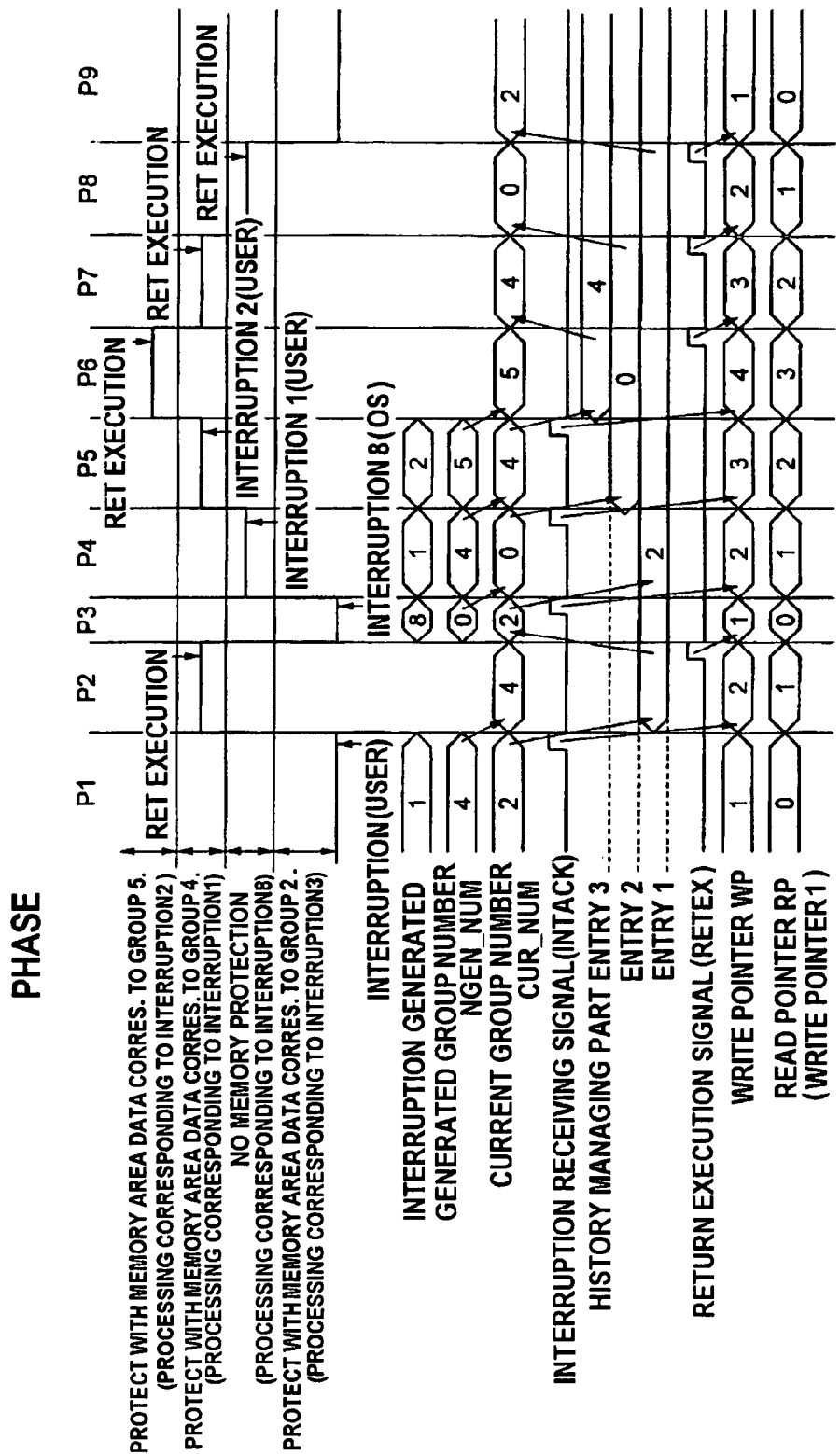
FIG. 2 is a time chart, which shows each parts operation of the memory protection apparatus accompanied with the processing progress.
Figure 3:
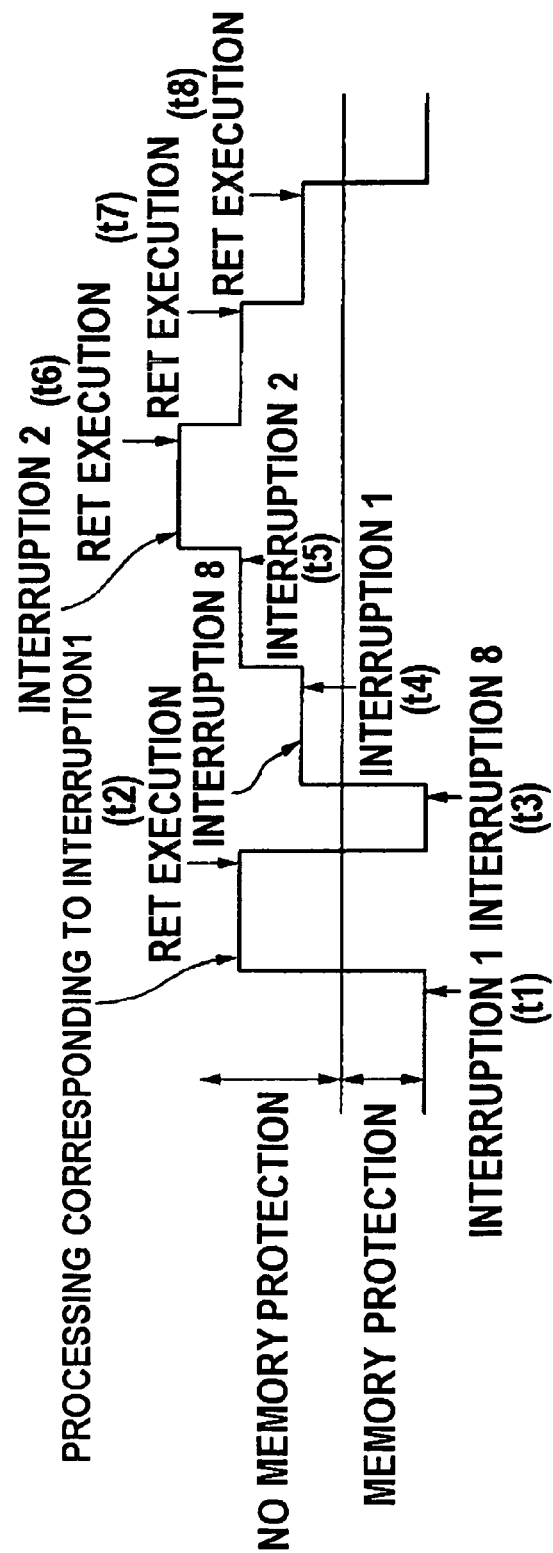
FIG. 3 is a time chart, which shows the change of the processing to be executed by the processor.

FIG. 2 shows the timing chart of the operation of each part of the memory protection apparatus 100. The operation of each part will be described below in detail with reference to an example of the operation of the memory protection apparatus 100. Further, here, the group numbers designated to each interruption are defined as follows. Interruption INT (1) is designated to Group 4, interruption INT (2) is designated to Group 5, and the interruption INT (3) is designated to Group 2. Besides, interruption INT (8), that is the interruption of OS, is designated to Group 0.

In phase P1, the processor executes a processing corresponding to interruption INT (3). In this state, the group number register 131 retains group number [2] corresponding to interruption INT (3) and outputs the current group number CUR_NUM [2]. Besides, the selection circuit 133 selects the memory area designating register 132 (2) in response to group number [2]. The address bus watching circuit 106 watches the address bus according to the data related to the memory area retained in the memory area designating register 132 and executes a memory protection function corresponding to group number [2].

In phase P1, interruption INT (1) is generated as an interruption (signal) to be received next time by the processor. The group number generating circuit 101 outputs group number [4] retained by the group number register 111 corresponding to the interruption INT (1) as a generated group number NGEN_NUM. The history memorizing part 141 is in the state not to memorize the group number, and the write pointer (WP)142 retains [entry 1] to show the head address of the history memorizing part 141. In this time, the read pointer (RP) 143 retains [entry 0] to show no address to be read out and the history managing buffer 104 outputs group number [0] to show no memory protection as the return group number RET_NUM (not shown in FIG. 2).

When the interruption INT(1) is received by the processor, the processor interrupts the processing during its execution, and shifts to phase P2 to execute a processing corresponding to the interruption INT (1) newly received. At this phase, in the history managing buffer 104, a current group number CUR_NUM [2] is memorized at [entry 1] of the history memorizing part 141 shown by the write pointer (WP) 142, according to the interruption receiving signal INTACK which is in the activated state, and the values of the write pointer (WP) 142 and read the pointer 143 are incremented.

Upon shifting from phase P1 to phase P2, in the memory data generating circuit 103, the group number retained by the group number register 131 is updated by a generated group number GEN_NUM [4] to be input through the selector 102, and the selection circuit 133 selects a memory area designating register 132 (4) according to the updated group number [4]. The address bus watching part 106 watches the address bus according to the data related to the memory area retained by the memory area designating register 132 (4), and at phase P2, the memory protection function realizes corresponding to the group number [4].

The processing of the interruption INT (1) is completed and the processor generates the return instruction, and then it shifts to phase P3 to reopen the processing of phase P1 that was interrupted. As the address retained by the read pointer (RP) 143 becomes [entry 1] in phase 2, the history managing buffer 104 outputs the group number [2] memorized in [entry 1] of the history memorizing part 141 as a returning group number RET_NUM. In the memory data generating circuit 103, the group number, which the group number register 131 retains, is updated by the returning group number RET_NUM[2] according to the return instruction execution signal RETEX which is activated, and the selection circuit 133 selects the memory area designating register 132 (2) according to the updated group number [2]. Therefore, like in phase P1, the address bus watching part 106 watches the address bus according to the data related to the memory area which the memory area designating register 132 (2) retains; and in phase P3, the memory protection function corresponding to the group number [2] is realized.

Upon shifting from phase P2 to phase P3, in the history managing buffer 104, the values of the write pointer (WP) 142 and read pointer (RP) 143 are decremented according to the return instruction execution signal RETEX which is activated. Therefore, the write pointer (WP) 142 retains again [entry 1] while the read pointer (RP) 143 retains [entry 0].

In phase P3, the interruption INT (8) is generated, which is to be received at next time in the processor. The group number generating circuit 101 outputs group number [0] which the group number designating register 111 (8) corresponding to the interruption INT (8) retains and shows no memory protection, as a generated group number NGEN_NUM. When the interruption INT (8) is received by the processor, the processing which was in the execution in phase P3 is interrupted again, and shifts to phase P4 where the processing corresponding to the interruption INT (8) newly received is executed.

Upon shifting from phase P3 to phase P4, the current group number CUR_NUM [2] is memorized in [entry 1] of the history memorizing part 141 and the values of the write pointer (WP) 142 and the read pointer (RP) 143 are incremented like the shift from phase P1 to phase P2. Besides, the group number retained by the group number register 131 is updated by the generated group number NGEN_NUM [0], and the selection circuit 133 outputs NULL which shows no memory protection. Therefore, in phase P4, the processing corresponding to the interruption INT (8) is executed without memory protection.

In phase P4, the interruption INT (1) which is received at next time by the processor occurs again. When the interruption INT (1) is received again by the processor, the processing corresponding to the interruption INT (8) is interrupted, and shifting occurs to phase P5, in which the processing corresponding to the interruption INT (1) is executed, a current group number CUR_NUM [0] is memorized in [entry 2] of the history memorizing part 141 and the values of write pointer (WP) 142 and the read pointer (RP) 143 are incremented. Besides, the group number retained by the group number register 131 is updated by the generated group number NGEN_NUM [4], and the address bus watching part 106, like in phase P2, watches the address bus according to the data related to the memory area retained by the memory area designating register 132 (4), and, in phase P5, the memory protecting function corresponding to the memory number [4] is realized.

In phase P5, the interruption INT (2) to be received at next time by the processor occurs. The group number generating circuit 101 outputs a group number [5] retained by the group number register 111 (2), as a generated group number NGEN_NUM. When the interruption INT (2) is received in the processor and it shifts to phase P6 where a processing corresponding to the interruption INT(2) is executed, the current group number CUR_NUM [4] is memorized in [entry 3] of the history memorizing part 141, and the group number retained by the group number register 131 is updated by a generated group number NGEN_NUM [5]. The address bus watching part 106 watches the address bus according to the data related to the memory area retained by the memory area designating register 132 (5), and, in phase P6, the memory protection function corresponding to the group number [5] is realized.

In phase P6, when the processor generates a return instruction, phase 6 shifts to phase 7 where the processor reopens the processing corresponding to the interruption INT (1) which was interrupted in phase P5. At this time, the group number retained by the group number register 131 is updated by the group number [4] memorized in [entry 3] shown by the read pointer (RP) 143, and the selection circuit 133 selects a memory area designating register 132 (4), like in the case of shifting from phase P2 to phase P3. The address bus watching part 106 watches the address bus according to the data related to the memory area retained by the memory area designating register 132 (4) like in phase P5, whereas, in phase P7, the memory protection function corresponding to the group number [5] is realized. Besides, in the history managing buffer 104, the values of the write pointer (WP) 142 and the read pointer (RP) 143 are decremented Therefore, in phase P7, when the processor generates the return instruction, the group number register 131 is updated by the group number [0] memorized in [entry 2] of the history memorizing part 141, and in phase P8, the processing corresponding to the interruption INT (8) is reopened without memory protection function. Besides, in phase P8, when the processor generates the return instruction, the group number register 131 is updated by group number [2] memorized in [entry 1] of the history memorizing part 141; and in phase P9, the processing corresponding to the interruption INT (3), which was interrupted in phase P3, reopens under the memory protection function corresponding to group [2].

In this embodiment, the memory data generating circuit 103, which memorizes data related to the accessible memory area in the processing corresponding to the interruption designated to the group itself, in response to each group, selects the data related to the accessible memory area in the processing corresponding to the interruption presently to be processed according to the group numbers retained by the group number register 131, and outputs them. Therefore, for example, even when the program is generated for every group, and the state of use of the memory in the other groups cannot be found previously, it can prevent the occurrence that the memory area, which the processing corresponding to an interruption to be designated to some group uses as the data area, is rewritten by the processing corresponding to the interruption designated to the other groups, and the memory protection can be achieved.

Because, usually, at the time of beginning the processing corresponding to the interruption and at the time of returning from the processing corresponding to the interruption, respectively, the OS attempted the memory protection to designate the accessible memory area to be executed at next time, it took a long time to realize the memory protection, resulting in worsening of the response characteristics. Because, in this embodiment, without response to the OS (not through OS), the memory protection is realized by the hardware, it takes a shorter period of time to realize the memory protection and is possible to maintain the high interrupting response. Thus, even in the system for which high real time is required, it is possible to execute each processing maintaining the memory protection together with increase in the reliability of the system to prevent destruction of the programs and data upon occurrence of the violation of the memory protection.

In this embodiment, when the processor receives a new interruption, it stores the group number designated to the currently executing interruption in the history managing buffer 104 and updates the group number register 131 with a group number designated by the interruption newly received. Besides, when a return instruction is generated in the interruption of current execution, the processor updates the group number register 131 by a group number corresponding to the interruption which was executed immediately preceding the interruption of the current execution. By the arrangement like this, in case where the interruptions occur multiply, the memory data generating circuit 103 can correctly designate the data related to the accessible memory area(s) corresponding to the group designated by the interruption in the returning place.

Further, in the above embodiment, the example that the group number generating circuit 101 generates the group number corresponding to the interruption occurred with reference to the group number designating register 111 which is adapted to correspond to each interruption, is described. However, instead of the above embodiment, it may be considered that the group number is generated with reference to a table, which is prepared in the group number generating circuit 101 to give each of interruptions correspondence to the group number. Besides, the history managing buffer 104 may be those ones that can retain the history of the group number designated by an interruption executed before an interruption of current execution, and it is not limited to the construction using the history memorizing part 141, the write pointer (WP)142 and the read pointer (RP) 143.

In the above embodiment, the interruption of the OS level is designated to group 0 as the particular interruption. However, instead of the above embodiment, it is possible to set the interruption of the OS level to some group of the group number [1] to [m], without particular distinction between the instructions of the OS level and the instructions of the user level. In this case, the memory area designating register 132 corresponding to the group assigned to the OS level interruption can be formulated such that a processing corresponding to an interruption of a group retains data representative of all of the memory areas or NULL. Thus, it is possible to formulate such an arrangement that, in the processing corresponding to the OS level interruption, the address bus watching part 106 does not detect the illegal memory protection.

The present invention has been described according to the preferred embodiments, however, the memory protection apparatus is not limited only to the above embodiments. It should be concluded that in the present invention various modifications may be introduced from the disclosed arrangements of the above embodiments.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A memory protection apparatus for protecting memory to limit memory access by a processor which executes processing corresponding to interruptions, comprising:
   a memory data generating circuit for generating and outputting memory area data which designates an accessible memory area corresponding to a processing executed by the processor, and
   a memory access watching circuit for outputting a signal representing generation of illegal memory access to areas other than those which are designated by the memory area data generated by said memory data generating circuit, wherein
   a group number is set for each of the interruptions, and said memory data generating circuit comprises:
      a memory area data storage part for storing said memory data area corresponding to said group number,
      a group number register for storing interruption group numbers corresponding to the processing under execution of the processor, and
      a memory area data selection part for reading out said memory area data from said memory area data storage part according to the data stored in said group number register.

2. The memory protection apparatus as defined in claim 1, wherein said memory protection apparatus further comprises a group number generating circuit for generating a group number corresponding to an interruption generated, said group number register being updated by a group number from said group number generating circuit when the processor receives an interruption.

3. The memory protection apparatus as defined in claim 2, wherein said memory protection apparatus further comprises a history managing part for storing a group number of an interruption received by the processor, said history managing part storing the group number stored in said group number register prior to updating the group number in said group number register.

4. The memory protection apparatus as defined in claim 3, wherein said history managing part comprises a stack area storing a plurality of group numbers.

5. The memory protection apparatus as defined in claim 3, wherein said group number register is updated by the group number stored by said history managing part.

6. A method for protecting memory within an apparatus so as to limit memory access by a processor which executes processing corresponding to interruptions, said method comprising:
   setting a group number for each interruption;
   generating memory area data which designates an accessible memory area corresponding to a processing executed by the processor;
   storing said memory data area;
   storing interruption group numbers corresponding to the processing under execution of the processor;
   reading out said memory area data from said stored memory area data according to said stored group interruption numbers;
   monitoring memory access; and
   outputting a signal representing generation of illegal memory access to areas other than those which are designated by the memory area data.

7. The memory protection method as defined in claim 6, further comprising:
   generating a group number corresponding to an interruption generated; and
   updating a group number register by said generated group number when the processor receives an interruption.

8. The memory protection method as defined in claim 7, further comprising:
   storing a group number of an interruption received by the processor prior to updating the group number in said group number register.

9. The memory protection method as defined in claim 8, wherein a plurality of group numbers are stored in a stack area.

10. The memory protection method as defined in claim 8, further comprising updating said group number register by the stored group number.

* * * * *